(12) United States Patent
Inoue et al.

(10) Patent No.: US 8,491,132 B2
(45) Date of Patent: Jul. 23, 2013

(54) PROJECTOR

(75) Inventors: Keigo Inoue, Kanagawa (JP); Kazuhiro Fukuta, Shizuoka (JP)

(73) Assignee: Sony Corporation (JP)

( * ) Notice: Subject to any disclaimer, the term of this patent is extended or adjusted under 35 U.S.C. 154(b) by 373 days.

(21) Appl. No.: 12/930,741

(22) Filed: Jan. 14, 2011

(65) Prior Publication Data

US 2011/0176115 A1    Jul. 21, 2011

(30) Foreign Application Priority Data

Jan. 21, 2010   (JP) ................. P2010-011172

(51) Int. Cl.
*G03B 21/26* (2006.01)
(52) U.S. Cl.
USPC ............................................. 353/94
(58) Field of Classification Search
USPC .................................... 353/94, 98
See application file for complete search history.

(56) References Cited

U.S. PATENT DOCUMENTS 7,201,483 B2 *   4/2007   Chung et al. ................. 353/94

FOREIGN PATENT DOCUMENTS

JP   2003-029341 A   1/2003

* cited by examiner

*Primary Examiner* — Thanh Luu
(74) *Attorney, Agent, or Firm* — Lerner, David, Littenberg, Krumholz & Mentlik, LLP

(57) ABSTRACT

Provided is a projector which includes a first lamp, a second lamp in an identical direction to the first lamp, a projection optical system that emits image light to an outside, a first mirror that reflects the light from the first lamp or the second lamp to cause the light to enter the lighting optical system, a movable mirror that, when the first lamp is turned on, causes the light to directly enter the first mirror by deviating from an optical path connecting the first lamp and the first mirror and, when the second lamp is turned on, reflects the light by being set up on the optical path to cause the light to enter the first mirror, and a second mirror that reflects the light from the second lamp to cause the light to enter the movable mirror.

5 Claims, 6 Drawing Sheets

PROJECTOR

CROSS-REFERENCE TO RELATED APPLICATION

The present application claims priority from Japanese Patent Application No. JP 2010-011172 filed in the Japanese Patent Office on Jan. 21, 2010, the entire content of which is incorporated herein by reference.

BACKGROUND OF THE INVENTION

1. Field of the Invention

The present invention relates to a projector.

2. Description of the Related Art

A projector, which is a display apparatus to project images, irradiates a screen or the like with light that has passed through, for example, liquid crystal panels using a high-intensity lamp as a light source. A two-lamp type projector equipped with two lamps is known. The two-lamp type projector can be classified into one type that turns on the two lamps simultaneously to increase brightness and the other type, a switching type, that normally turns on and uses only one lamp to preserve the other lamp as a backup.

Lamps contained in a projector generate heat while turned on, which makes the temperature of the lamps or that inside the projector rise. Thus, the projector has a cooling system such as an air supply fan or exhaust fan installed therein to cool the lamps and an inner part thereof.

Japanese Patent Application Laid-Open No. 2003-29341 discloses a projection display that has a light source with higher power consumption and a light source with lower power consumption and switches an optical axis by an optical axis switching mirror to strive to reduce power consumption.

SUMMARY OF THE INVENTION

Incidentally, as shown in FIG. 4, a two-lamp switching projector in the related art has two lamps 12 arranged in a symmetrical physical relationship while sandwiching a lighting optical system 20 and a movable mirror 14 therebetween. FIG. 4 is a plan view showing a projector 10 in the related art. FIG. 4 schematically shows main internal components of the optical system and an exhaust fan 50 in a state in which an external case of the projector 10 is removed.

The projector 10 in the related art shown in FIG. 4 includes the lamps 12, the movable mirror 14, the lighting optical system 20, a projection optical system 30, and the exhaust fan 50. In the projector 10 of two-lamp switching type, light is shone only from the one lamp 12 of the two lamps 12. The two lamps 12 are arranged so that irradiation directions of light are opposite to each other.

The movable mirror 14 is arranged so that the angle of incidence of light from the one lamp 12 becomes about 45 degrees and, when the one lamp 12 is turned on, causes the light from the lamp 12 to reflect to the lighting optical system 20. When the other lamp 12 is turned on, the light from the other lamp 12 is caused to reflect to the same lighting optical system 20 by rotating the movable mirror 14 in an appropriate direction by about 90 degrees. The light reflected by the movable mirror 14 enters the lighting optical system 20.

The lighting optical system 20 once separates the incident light into three primary colors (RGB) and then causes the separated lights to pass through liquid crystal panels 70R, 70G, and 70B for synthesis. The lighting optical system 20 includes a fly eye lens 61, a PS sensing element 62, a condensing lens 63, dichroic mirrors 64 and 66, mirrors 65, 67, and 68, a cross prism 69, and the liquid crystal panels 70R, 70G, and 70B. The light synthesized by the lighting optical system 20 is projected onto a screen or the like from the projection optical system 30 as an image via the projection optical system 30.

A reflector of the lamp 12 shown in FIG. 4 has a parabolic shape, but a lamp 22 having a reflector in an elliptic shape shown in FIG. 5 may be used as a light source of the projector 10. FIG. 5 is a plan view showing the projector 10 in the related art. While the lamp 12 having the reflector in the parabolic shape shines parallel light, the lamp having the reflector in the elliptic shape has a property to cause irradiation light to aggregate toward another focus present in the irradiation direction of light. Thus, when the lamp 22 having the reflector in the elliptic shape is used, light is caused to enter the lighting optical system 20 after making the light from the light source parallel light by using at least one lens of lenses 24, 25 and so on. A total distance (=M1+M2+M3) of the distance between the lamp 22 and the lens 25, that is, a distance M1 between the lamp 22 and the lens 24 in FIG. 5, a distance M2 between the lens 24 and a movable mirror 26, and a distance M3 between the movable mirror 26 and the lens 25 is determined by properties of the reflector of the lamp 22 and the lenses 24 and 25. Therefore, when the lamp 22 having the reflector in the elliptic shape is used, the position of the lamp 22 is determined by properties of the reflector of the lamp 22 and the lenses 24 and 25.

Incidentally, the configuration of the movable mirror 14/26, the lighting optical system 20, and the projection optical system 30 is the same for the lamp 12 having the reflector in the parabolic shape and the lamp 22 having the reflector in the elliptic shape.

Thus, in the projector 10 in the related art, the two lamps 12/22 are arranged opposite to each other and the movable mirror 14/26 to switch the optical path at an intermediate position of the two lamps 12/22 is arranged. Arrangement of the lamps 12/22 and arrangement of the movable mirror 14/26 and the lighting optical system 20 are easy as an optical design. However, as shown in FIGS. 4 and 5, a distance L4 between an end P of the one lamp 12/22 and an emission point R of light of the projection optical system 30 becomes long. When an external shape of the projector 10 is determined, the optical axis (axis passing through the emission point R) of the projection optical system 30 is generally set in many cases in the center of the external shape. For that purpose, however, it is necessary to provide the distance L4 symmetrically about the optical axis of the projection optical system 30. Therefore, the width of the external shape of at least L4×2 is necessary, posing an issue of a growing size of the whole projector 10.

Because the two lamps 12/22 are set apart, it is necessary to construct a cooling system for each of the lamps 12/22. Particularly the exhaust fan 50 for exhausting air needs to be constructed by adjusting to the positions of the lamps 12/22 so that air passing through the lamps 12/22 is efficiently exhausted to the outside. As a result, the two exhaust fans 50 are installed on the external case near the lamps 12/22, occupying a wide area of the projector 10 for the arrangement of the two exhaust fans 50.

If the lamp 12 generates heat when turned on, the temperature in an area positioned above the lamp 12 rises more than an area positioned below the lamp 12. If the irradiation surface (glass surface) of the lamp 12 is positioned above the reflection surface (reflector) by the projector 10 being tilted, the lamp 12 may be damaged by heat. Conversely, if the reflection surface (reflector) of the lamp 12 is positioned above the irradiation surface (glass surface), the lamp 12 may also be damaged by heat.

As the installation method of the projector 10, as shown in FIG. 6A, the projector 10 may be arranged in parallel with a horizontal installation plane to shine image light in the horizontal direction or, as shown in FIGS. 6B and 6C, the projector 10 may be arranged in a slanting direction to the horizontal installation plane to shine image light obliquely upward. FIGS. 6A and 6B are side views showing the projector 10 according to the present embodiment. FIG. 6C is a side view showing the projector 10 according to the present embodiment.

Therefore, it is preferable that tilting of the irradiation direction of the lamps 12 not change even though the projector 10 is tilted. For this purpose, the lamps 12 are arranged in such a way that the irradiation direction of the lamps 12 is substantially perpendicular to the optical axis of the projection optical system 30. As a result, as shown in FIGS. 6B and 6C, tilting of the irradiation direction of the lamps 12 does not change when the projector 10 is arranged obliquely. Therefore, damage of the lamps 12 is avoided without the irradiation surface or the reflection surface of the lamps 12 being positioned above.

Thus, when the lamps 12 are arranged inside the projector 10, not only the installation position thereof is limited, but also it is necessary to arrange the lamps 12 by considering the irradiation direction of the lamps 12.

In view of the foregoing, it is desirable to provide a novel and improved projector capable of reducing the size of the whole apparatus while realizing a simple structure.

According to an embodiment of the present invention, there is provided a projector including a first lamp serving as a light source, a second lamp arranged so as to shine in the same direction as the first lamp to make an irradiation direction parallel, a lighting optical system that has light from the first lamp or the second lamp incident thereon, generates image light, and emits the image light, a projection optical system that has an optical axis substantially perpendicular to the irradiation direction of the first lamp and the second lamp, has the image light from the lighting optical system incident thereon, and emits the image light to an outside, a first mirror that is arranged opposite to the first lamp and the second lamp across the optical axis of the projection optical system and reflects the light from the first lamp or the second lamp to cause the light to enter the lighting optical system, a movable mirror that, when the first lamp is turned on, causes the light from the first lamp to directly enter the first mirror by deviating from an optical path on a straight line connecting the first lamp and the first mirror and, when the second lamp is turned on, reflects the light from the second lamp by being set up on the optical path on the straight line connecting the first lamp and the first mirror to cause the light to enter the first mirror, and a second mirror that reflects the light from the second lamp to cause the light to enter the movable mirror.

The movable mirror may rotate around an axis in the direction perpendicular to a horizontal plane when installed.

The first lamp and the second lamp may be arranged adjacent to each other.

An incident point of the light of the lighting optical system where the light from the first mirror enters may be positioned opposite to the first lamp and the second lamp across the optical axis of the projection optical system.

The lighting optical system may have the light from the first lamp or the second lamp incident thereon, separate the light by color, allow separated lights to pass through display panels to generate image light by color, synthesize the image lights, and emit the synthesized image light.

According to the embodiment of the present invention described above, the size of the whole apparatus can be reduced while realizing a simple structure.

DETAILED DESCRIPTION OF THE EMBODIMENT

Figure 1:
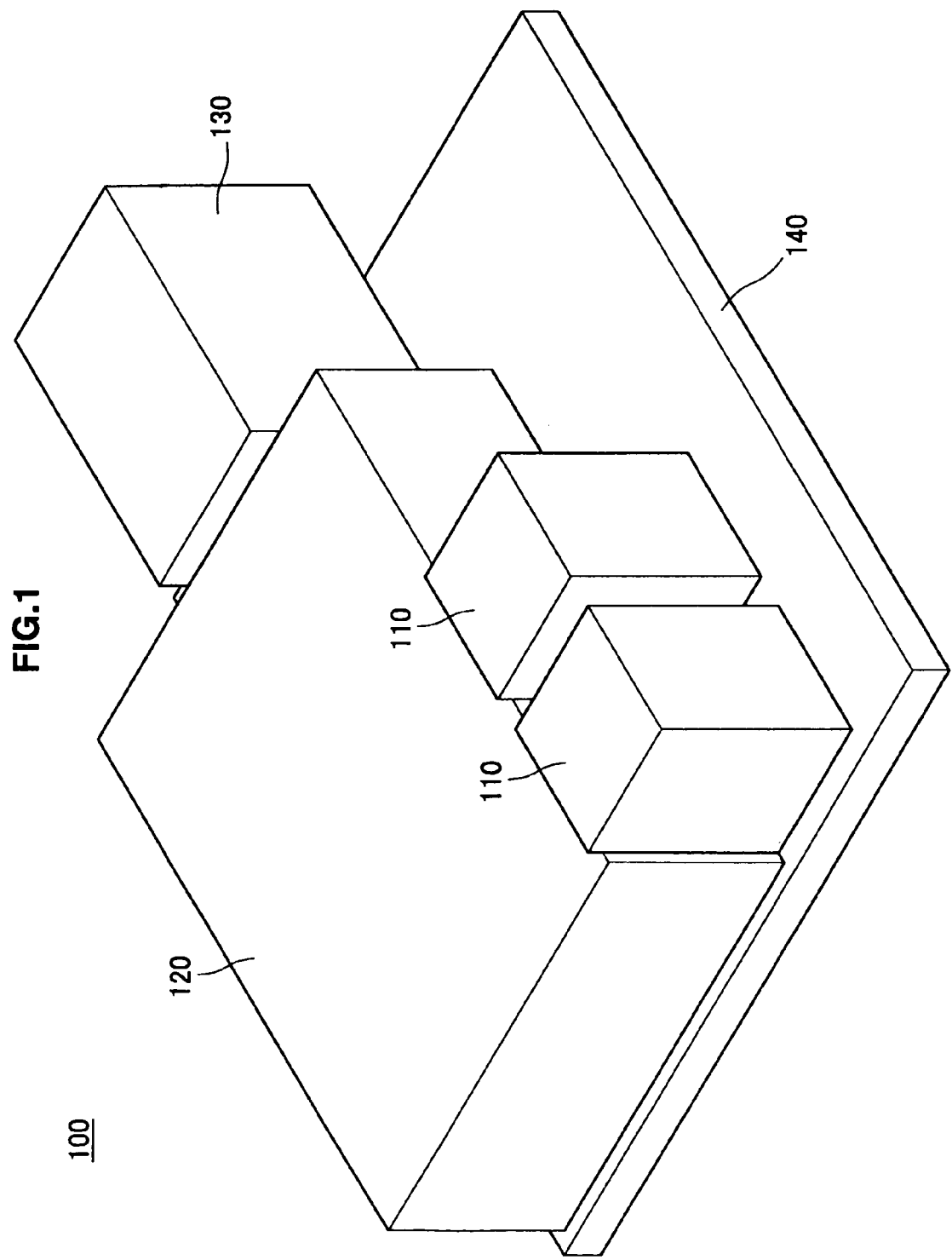
FIG. 1 is a perspective view of a projector 100 according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

The present invention will be described in the order shown below:

1. Outline Configuration of the Projector 100
2. Optical Path Switching Means of Light from Lamps 112A/112B
3. Irradiation Direction of the Lamps 112A/112B
4. Width of the Projector 100

<1. Outline Configuration of the Projector 100>

Figure 2:
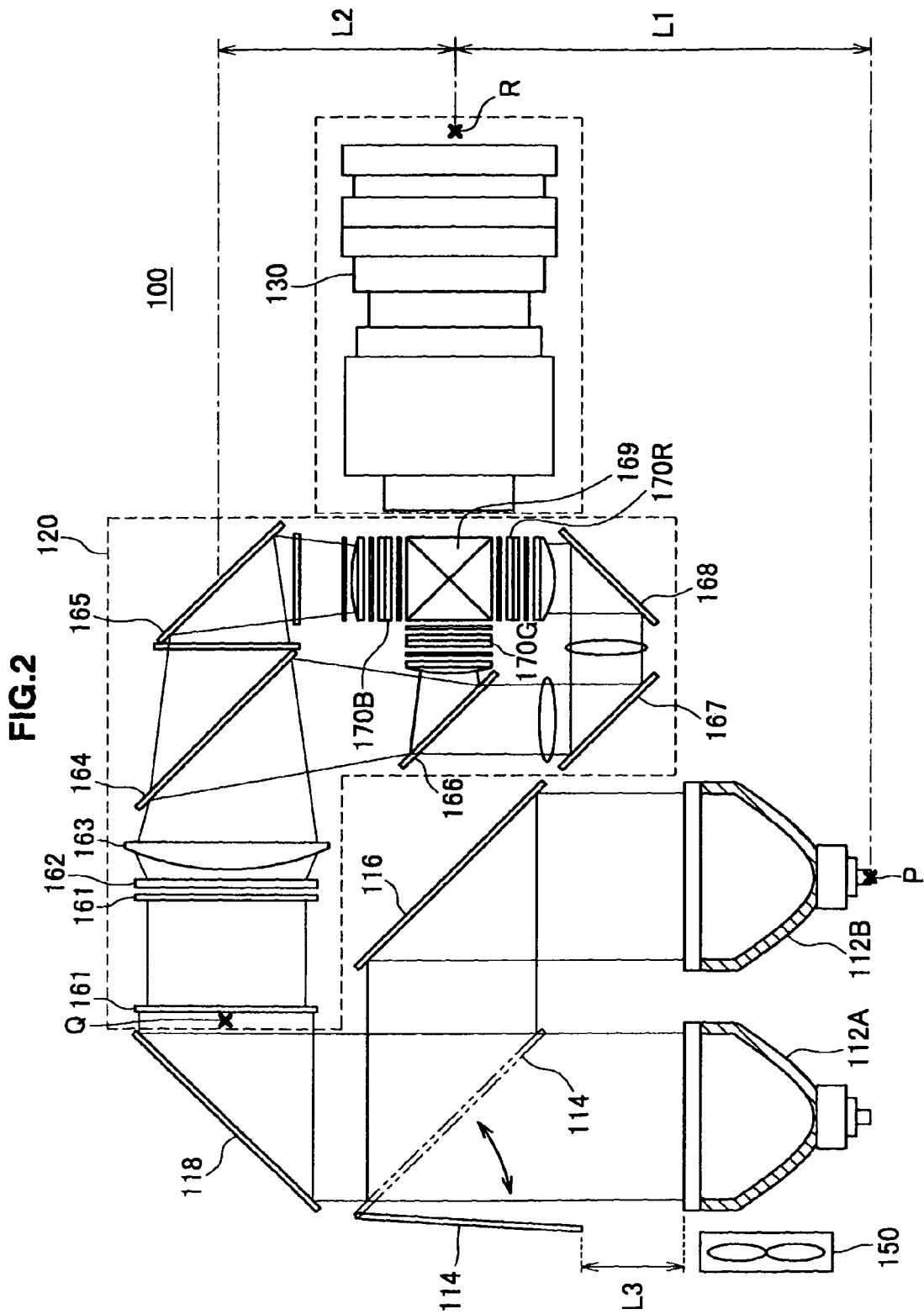
FIG. 2 is a plan view showing the projector 100 according to the embodiment.

First, the configuration of the projector 100 according to an embodiment of the present invention will be described with reference to FIG. 1. FIG. 1 is a perspective view of the projector 100 according to the present embodiment. FIG. 1 schematically shows main internal components installed on a base 140 in a state in which an external case of the projector 100 is removed. FIG. 2 is a plan view showing the projector 100 according to the present embodiment.

The projector 100 according to the present embodiment includes the lamps 112A/112B, a movable mirror 114, a lighting optical system 120, a projection optical system 130, and an exhaust fan 150. The projector 100 is a display apparatus projecting images and uses the high intensity lamps 112A/112B as light sources to project, for example, light that has passed through a liquid crystal panel 170R, 170G, or 170B onto a screen or the like. The projector 100 is of two-lamp switching type and normally turns on and uses the one lamp 112A (or 112B) and preserves the other lamp 112B (or 112A) as a backup.

The lamps 112A/112B are contained in a lamp box 110. The lamps 112A/112B are, for example, Xenon lamps, super-high pressure mercury lamps or the like. The lamps 112A/112B has, for example, a reflector in a parabolic shape and shine parallel light. In the present invention, lamps having a reflector in an elliptic shape may also be used. In this case, it is necessary to provide a lens between the lamp and the lighting optical system 120 to change light shone from the lamp to parallel light.

The light shone from the lamps 112A/112B is output into the lighting optical system 120. Since the projector 100 is of two-lamp switching type, one of the lamps 112A/112B is turned on according to the user's selection or settings inside the projector 100 when the projector 100 is used.

In contrast to the projector 10 in the related art, the lamps 112A/112B are arranged inside the projector 100 such that light is shone in the same direction so that the irradiation directions become parallel. Further, in contrast to the projector 10 in the related art, the lamps 112A/112B are arranged adjacent to each other. The lamps 112A/112B are examples of a first lamp and a second lamp.

Since the projector 100 is of two-lamp switching type, the movable mirror 114 that switches the optical path of light from the lamp 112A and the optical path of light from the lamp 112B is provided. Since the arrangement of the lamps 112A/112B is different from that in the projector 10 in the related art, the arrangement of the movable mirror 114 to switch the optical path of light from the lamps 112A/112B is different from that in the projector 10 in the related art. A detailed description of the optical path switching means such as the movable mirror 114 will be provided later.

The lighting optical system 120 once separates the light output from the lamp 112A/112B into three primary colors (RGB). Then, the lighting optical system 120 causes the separated lights to pass through the liquid crystal panels 170R, 170G, and 170B to generate image light of each color, which is then synthesized into one image light. The lighting optical system 120 outputs the image light generated through synthesis to the projection optical system 130.

The lighting optical system 120 includes a fly eye lens 161, a PS sensing element 162, a condensing lens 163, dichroic mirrors 164 and 166, mirrors 165, 167, and 168, a cross prism 169, and the liquid crystal panels 170R, 170G, and 170B.

The fly eye lens 161 converts incident light with higher brightness in the center than in the perimeter into uniform light. The PS sensing element 162 aligns polarization components of light to cause the light with aligned polarization components to enter the liquid crystal panels 170R, 170G, and 170B. The condensing lens 163 causes light from the lamp 112A/112B to converge. The dichroic mirror 164 causes blue light from incident light to pass through and red light and green light to reflect. The dichroic mirror 166 causes red light from incident light to pass through and green light to reflect. The mirrors 165, 167, and 168 cause incident light to reflect by changing the angle to, for example, a 90° direction. The liquid crystal panels 170R, 170G, and 170B each generate image light of each incident color (RGB). The cross prism 169 generates synthesized image light by synthesizing incident image light of each color and outputs the image light to the projection optical system 130.

The projection optical system 130 is constituted of, for example, a projector lens and projects image light output from the lighting optical system 120 onto a screen or the like. The projection optical system 130 has an optical axis substantially perpendicular to the irradiation direction of the lamps 112A/112B.

As a cooling system of the projector 100, for example, an air supply fan (not shown) and the exhaust fan 150 or the like are provided.

The air supply fan is, for example, a centrifugal fan. The air supply fan is connected to the lamps 112A/112B to supply air to each of the lamps 112A/112B to cool the lamps 112A/112B that generate heat when turned on.

The exhaust fan 150 is, for example, an axial fan. The exhaust fan 150 takes in air that has passed through the lamps 112A/112B and discharges the taken air out of the projector 100. The exhaust fan 150 is attached on, for example, an external case of the projector 100.

Only one unit of the exhaust fan 150 is arranged adjacent to the lamps 112A/112B. The two lamps 12 are arranged apart from each other in the projector 10 in the related art and thus, two units of the exhaust fan 150 are installed. In the present embodiment, on the other hand, the lamps 112A/112B are adjacent to each other and thus, the exhaust fan 150 can be made common to both so that the lamps 112A/112B can be cooled by installing only one unit of the exhaust fan 150. In the example shown in FIG. 2, the exhaust fan 150 is arranged adjacent to the one lamp 112A, but the present invention is not limited to such an example. For example, the exhaust fan may be arranged at an intermediate position between the two lamps arranged adjacent to each other.

<2. Optical Path Switching Means of Light from Lamps 112A/112B>

Next, the optical path switching means of light from the lamps 112A/112B will be described.

The optical path switching means switches the optical path so that light from the lamp 112A reaches the lighting optical system 120 when the lamp 112A is turned on and light from the lamp 112B reaches the lighting optical system 120 when the lamp 112B is turned on.

The optical path switching means is constituted of, for example, the movable mirror 114 and mirrors 116 and 118.

The optical path connecting the mirror 118 and the lamp 112A is perpendicular to the optical axis of the projection optical system 130 and passes near an incident point Q of light of the lighting optical system 120. The optical path connecting the mirror 116 and the lamp 112B is parallel to the optical path connecting the mirror 118 and the lamp 112A and positioned on the side of the emission point R of light of the projection optical system 130 from the incident point Q of light of the lighting optical system 120. The optical path connecting the mirror 116 and the movable mirror 114 when the lamp 112B is turned on is parallel to the optical axis of the projection optical system 130 and arranged near an extension line of the optical axis of the projection optical system 130.

The mirror 118 is an example of the first mirror and reflects light from the lamps 112A/112B to cause the light to enter the lighting optical system 120. The mirror 118 is arranged so that the angle of incidence of light from the lamps 112A/112B becomes about 45 degrees.

As shown in FIG. 2, the mirror 118 is installed near the incident point Q of light of the lighting optical system 120 where light from the mirror 118 is incident. The incident point Q is located at a position whose distance from the optical axis of the projection optical system 130 in the width direction is L2. The incident point Q is positioned opposite to the lamps 112A/112B across the optical axis of the projection optical system 130. Therefore, the mirror 118 is also positioned opposite to the lamps 112A/112B across the optical axis of the projection optical system 130.

The movable mirror 114 is movable to deviate from the optical path on a straight line connecting the lamp 112A and the mirror 118 or to be set up on the optical path on the straight line connecting the lamp 112A and the mirror 118.

When the lamp 112A is turned on, the movable mirror 114 deviates from the optical path on the straight line connecting the lamp 112A and the mirror 118 to cause light from the lamp 112A to directly enter the mirror 118. When the lamp 112B is turned on, on the other hand, the movable mirror 114 rotates about 45 degrees to be set up on the optical path on the straight line connecting the lamp 112A and the mirror 118 and reflects light from the lamp 112B to cause the light to enter the mirror 118. When the lamp 112B is turned on, the movable mirror 114 is arranged so that the angle of incidence of light from the lamp 112A becomes about 45 degrees.

The movable mirror 114 rotates around an axis in a direction perpendicular to the horizontal plane when installed. Accordingly, the movable mirror 114 can appropriately be rotated not only when the projector 100 is installed on a desk, but also when the projector is installed, for example, by reversing the top surface and bottom surface and hanging the projector from the ceiling. That is, if, in contrast to the present embodiment, the movable mirror is rotated around an axis in the horizontal direction with respect to the horizontal plane and set up by reversing the top surface and bottom surface, the movable mirror 114 may not operate, but such malfunctioning can be avoided in the present embodiment.

The mirror 116 is an example of the second mirror and reflects light from the lamp 112B to cause the light to enter the movable mirror 114. The mirror 116 is arranged so that the angle of incidence of light from the lamp 112B becomes about 45 degrees. The mirror 116 is arranged on the side of the emission point R of light of the projection optical system 130 from the incident point Q of light of the lighting optical system 120. The mirror 116 is also arranged near an extension line of the optical axis of the projection optical system 130. Accordingly, the lamp 112B shining light to enter the mirror 116 can also be installed on the side of the projection optical system 130 from the incident point Q of light of the lighting optical system 120 so that the size of the projector 100 can be made smaller.

The optical path switching means in the present embodiment operates as described below:

First, when the lamp 112A is turned on, the movable mirror 114 moves to a position deviating from the optical path on the straight line connecting the lamp 112A and the mirror 118. After the lamp 112A is turned on, light shone from the lamp 112A directly enters the mirror 118 and the mirror 118 reflects the light from the lamp 112A to cause the light to enter the lighting optical system 120. Accordingly, the light from the lamp 112A enters the lighting optical system 120.

When the lamp 112B is turned on, on the other hand, the movable mirror 114 moves to the optical path on the straight line connecting the lamp 112A and the mirror 118. After the lamp 112B is turned on, light shone from the lamp 112B enters the mirror 116 and the mirror 116 reflects the light from the lamp 112B to cause the light to enter the movable mirror 114. Then, the movable mirror 114 reflects the light from the mirror 116 to cause the light to enter the mirror 118. Lastly, the mirror 118 reflects the light from the movable mirror 114 to cause the light to enter the lighting optical system 120. Accordingly, the light from the lamp 112B enters the lighting optical system 120.

<3. Irradiation Direction of the Lamps 112A/112B>

Figure 3A:
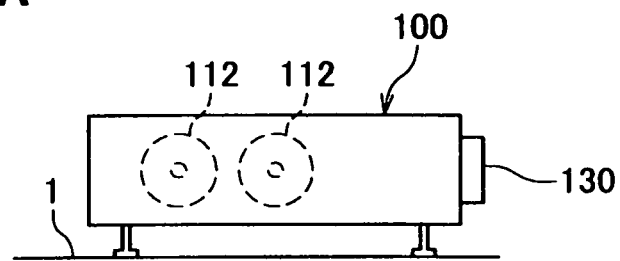
FIGS. 3A and 3B are side views showing the projector 100 according to the present embodiment.
Figure 3B:
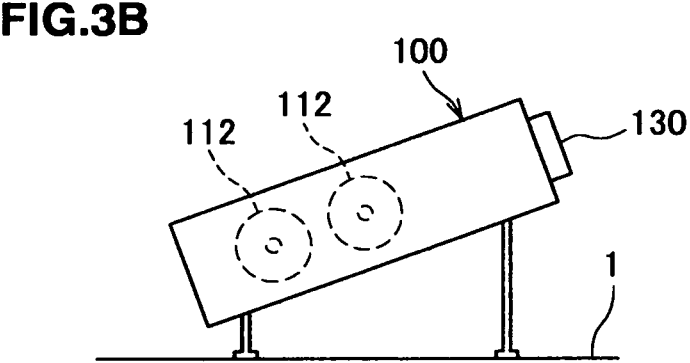
Figure 3C:
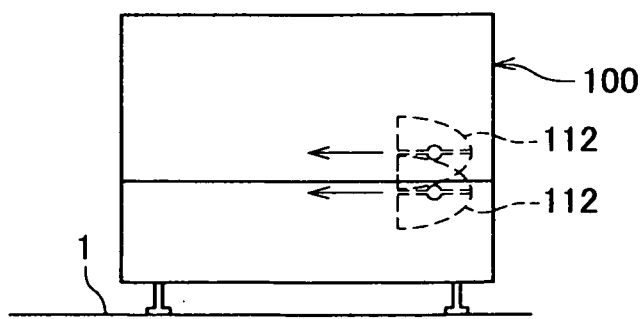
FIG. 3C is a side view showing the projector 100 according to the present embodiment.

The projection optical system 130 has the optical axis in a direction substantially perpendicular to the irradiation direction of the lamps 112A/112B. As the installation method of the projector 100, as shown in FIG. 3A, the projector 100 may be arranged in parallel with a horizontal installation plane to shine image light in the horizontal direction or, as shown in FIGS. 3B and 3C, the projector 100 may be arranged in a slanting direction to the horizontal installation plane to shine image light obliquely upward. FIGS. 3A and 3B are side views showing the projector 100 according to the present embodiment. FIG. 3C is a side view showing the projector 100 according to the present embodiment.

The lamps 112A/112B (hereinafter, also referred to collectively as the lamp 112) generate heat when turned on. If the lamp 112 generates heat, the temperature in an area positioned above the lamp 112 rises more than an area positioned below the lamp 112. If the irradiation surface (glass surface) of the lamp 112 is positioned above the reflection surface (reflector) by the projector 100 being tilted, the lamp 112 may be damaged by heat. Conversely, if the reflection surface (reflector) of the lamp 112 is positioned above the irradiation surface (glass surface), the lamp 112 may also be damaged by heat.

Therefore, it is preferable that tilting of the irradiation direction of the lamp 112 not change even though the projector 100 is tilted. For this purpose, the lamp 112 may be arranged such that the irradiation direction of the lamp 112 is substantially perpendicular to the optical axis of the projection optical system 130. As a result, as shown in FIGS. 3B and 3C, tilting of the irradiation direction of the lamp 112 does not change when the projector 100 is arranged obliquely. Therefore, damage of the lamp 112 is avoided without the irradiation surface or the reflection surface of the lamp 112 being positioned above.

In the present embodiment, the lamps 112 are arranged, as shown in FIG. 3, in consideration of the irradiation direction of the two lamps 112 while reducing the size of the projector 100. The irradiation direction of the lamps 112A/112B does not have to be exactly at a 90° angle from the optical axis of the projection optical system 130 and tilting thereof may be in a range that allows proper distribution of the temperature of the lamps.

<4. Width of the Projector 100>

The lamps 112A/112B are arranged opposite to the incident point Q of light of the lighting optical system 120 and the mirror 118 across the optical axis of the projection optical system 130. Accordingly, the position of an optical system component farthest away from the optical axis of the projection optical system 130 will be an end of the lamps 112A/112B, that is, P shown in FIG. 2. The end P is located at a position whose distance from the optical axis of the projection optical system 130 in the width direction is L1.

L1 can be reduced up to a position where the lamps 112A/112B do not come into contact with the movable mirror 114. That is, the lamps 112A/112B can be moved to a position where a distance L3 between the movable mirror 114 and the lamps 112A/112B shown in FIG. 2 becomes close to 0 (zero) to reduce L1.

Figure 4:
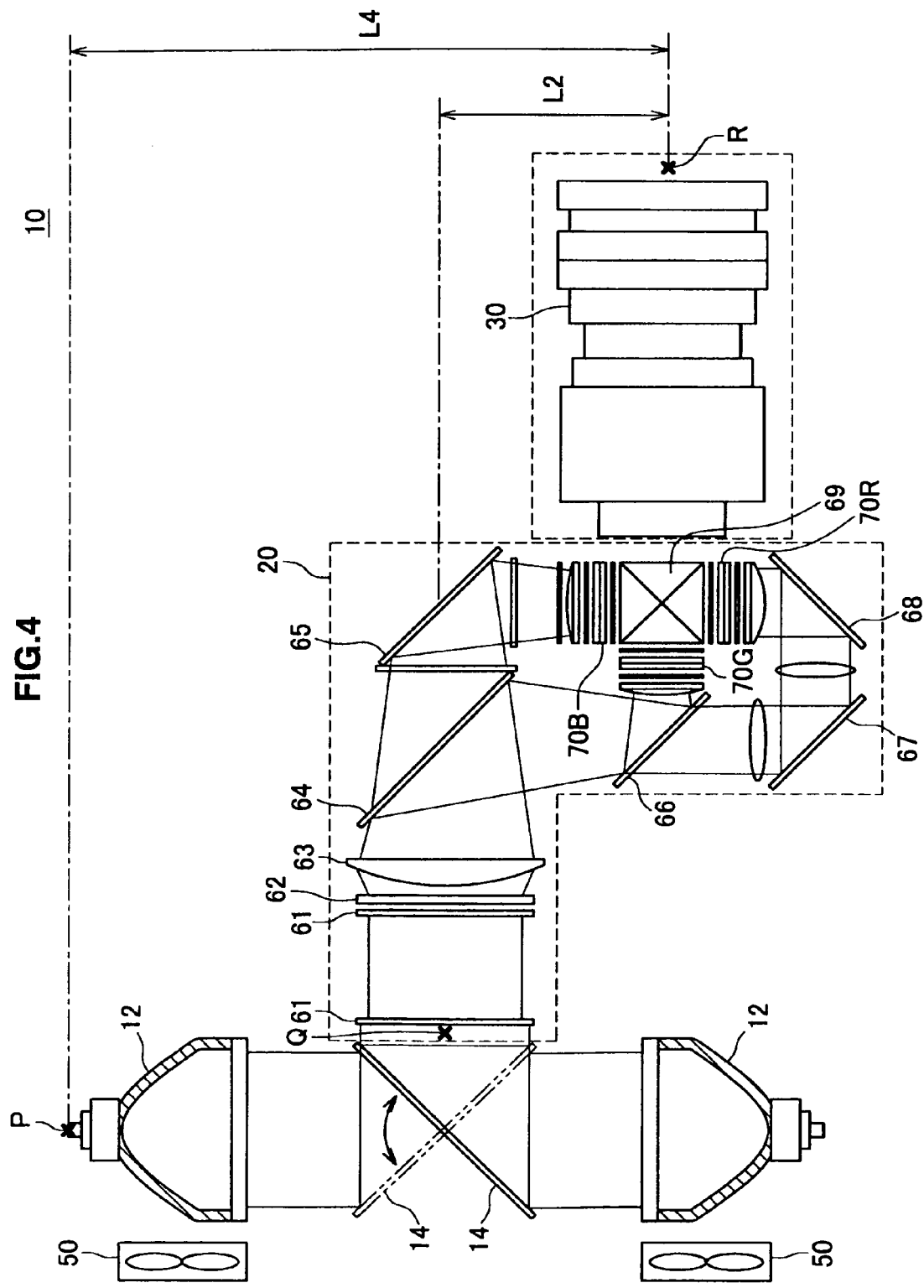
FIG. 4 is a plan view showing the projector 10 in the related art.
Figure 5:
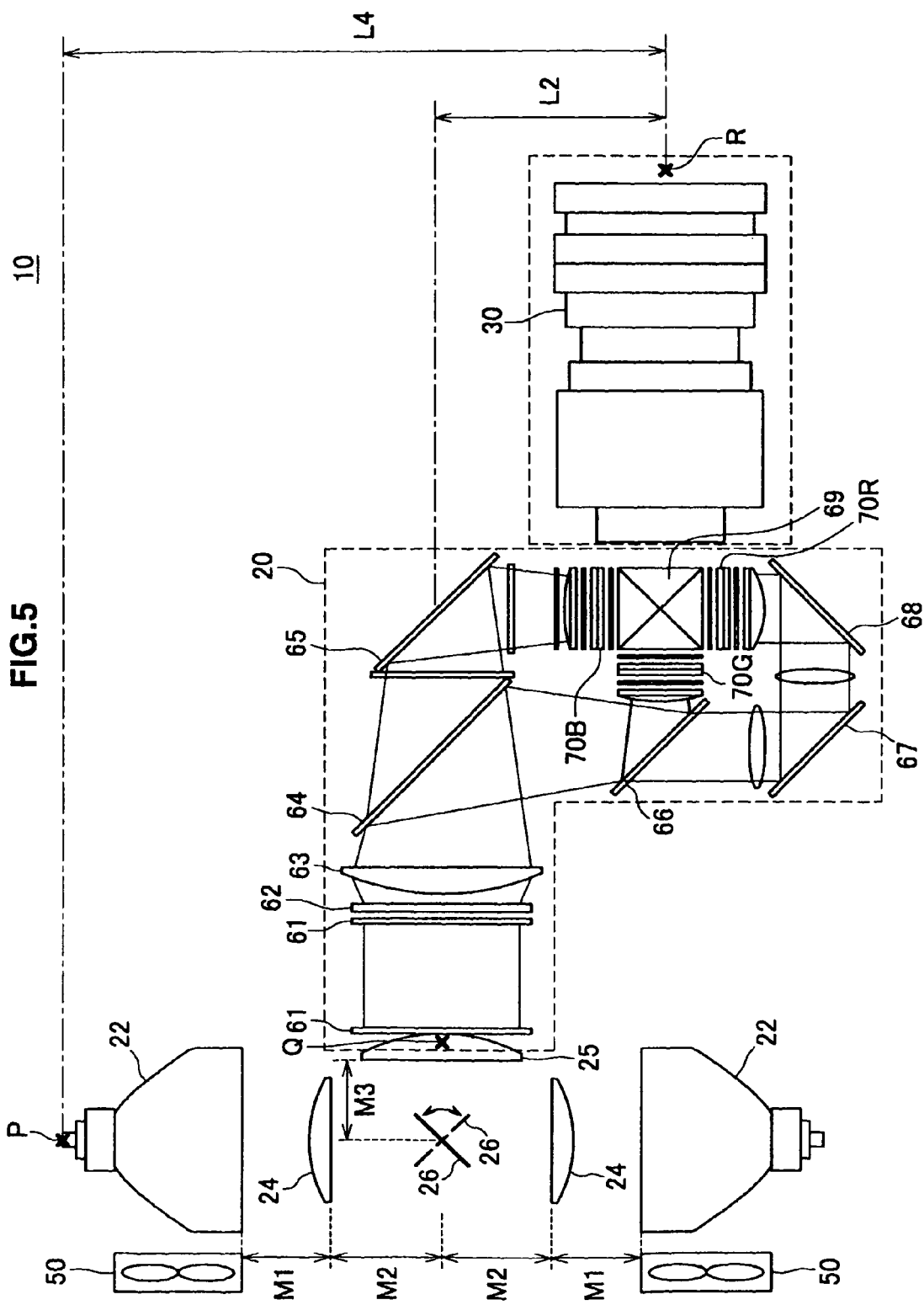
FIG. 5 is a plan view showing the projector 10 in the related art.
Figure 6A:
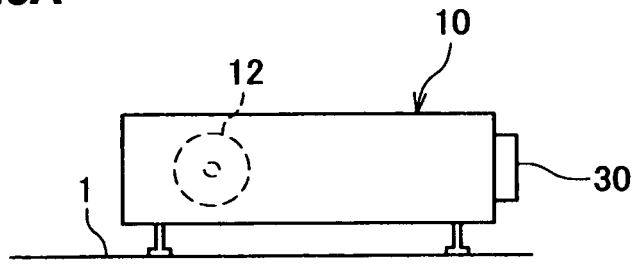
FIGS. 6A and 6B are side views showing the projector 10 according to the present embodiment.
Figure 6B:
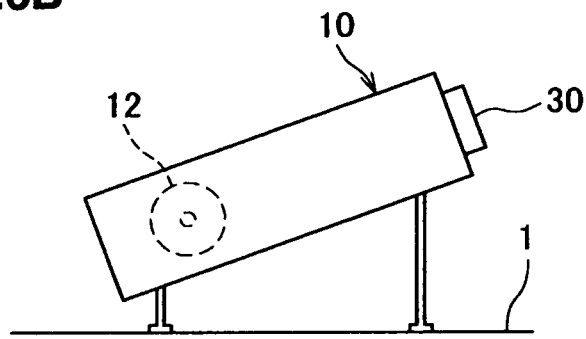
Figure 6C:
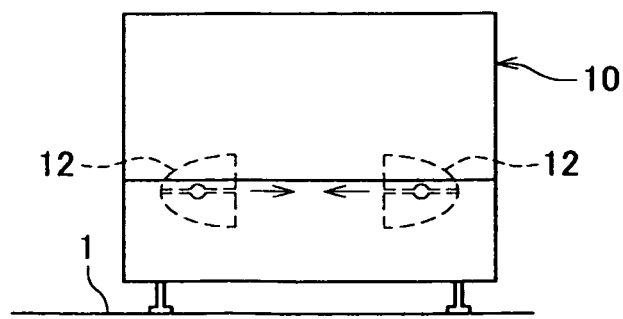
FIG. 6C is a side view showing the projector 10 according to the present embodiment.

In the projector 10 in the related art, the two lamps 12/22 are positioned opposite to each other across the movable mirror 14 or 26. Then, as shown in FIGS. 4 and 5, the position of an optical system component farthest away from the optical axis of the projection optical system 130 is the end P of the lamp 12 arranged on the outer side from the incident point Q of light of the lighting optical system 120. The end P is located at a position whose distance from the optical axis of the projection optical system 130 in the width direction is L4.

The interval L2 between the incident point Q of light of the lighting optical system 20 and the emission point R of light of the projection optical system 30 depends on structures of the lighting optical system 20 and the projection optical system 30. If the lighting optical system 20 has the configuration described above, it is difficult to reduce the interval L2 to below a fixed interval. Therefore, it has been difficult to reduce the distance L4 between the optical axis of the projection optical system 130 and the end P in the width direction.

On the other hand, the present embodiment has the same interval L2 between the incident point Q of light of the lighting optical system 120 and the emission point R of light of the projection optical system 130 as a projector in the related art. However, the lamps 112A/112B are arranged opposite to the incident point Q of light of the lighting optical system 120 and the mirror 118 across the optical axis of the projection optical system 130. Therefore, the distance L1 between the optical axis of the projection optical system 130 and the position (end P) of an optical system component farthest away from the optical axis can be made smaller than the distance L4 between the optical axis of the projection optical system 30 and the end P in the width direction of a projector in the related art so that the size of the whole apparatus can be made smaller.

According to the present embodiment, as is clear from the above, when the external shape of the projector 100 is decided, particularly the width of the external shape can be reduced compared with a projector in the related art when the optical axis (axis passing through the emission point R) of the projection optical system 130 is set in the center of the external shape.

It should be understood by those skilled in the art that various modifications, combinations, sub-combinations and alterations may occur depending on design requirements and other factors insofar as they are within the scope of the appended claims or the equivalents thereof.

In the above embodiment, for example, a case where the two lamps 112A/112B are installed in the projector 100 has been described, but the present invention is not limited to such an example and can similarly be applied by increasing the number of movable mirrors when three or more lamps are installed in a projector.

What is claimed is:

1. A projector comprising:
    a first lamp serving as a light source;
    a second lamp arranged so as to shine in the same direction as the first lamp to make an irradiation direction parallel;
    a lighting optical system that has light from the first lamp or the second lamp incident thereon, generates image light, and emits the image light;
    a projection optical system that has an optical axis substantially perpendicular to the irradiation direction of the first lamp and the second lamp, has the image light from the lighting optical system incident thereon, and emits the image light to an outside;
    a first mirror that is arranged opposite to the first lamp and the second lamp across the optical axis of the projection optical system and reflects the light from the first lamp or the second lamp to cause the light to enter the lighting optical system;
    a movable mirror that, when the first lamp is turned on, causes the light from the first lamp to directly enter the first mirror by deviating from an optical path on a straight line connecting the first lamp and the first mirror and, when the second lamp is turned on, reflects the light from the second lamp by being set up on the optical path on the straight line connecting the first lamp and the first mirror to cause the light to enter the first mirror; and
    a second mirror that reflects the light from the second lamp to cause the light to enter the movable mirror.

2. The projector according to claim 1, wherein the movable mirror rotates around an axis in the direction perpendicular to a horizontal plane when installed.

3. The projector according to claim 1, wherein the first lamp and the second lamp are arranged adjacent to each other.

4. The projector according to claim 1, wherein an incident point of the light of the lighting optical system where the light from the first mirror enters is positioned opposite to the first lamp and the second lamp across the optical axis of the projection optical system.

5. The projector according to claim 1, wherein the lighting optical system has the light from the first lamp or the second lamp incident thereon, separates the light by color, allows separated lights to pass through display panels to generate image light by color, synthesizes the image lights, and emits the synthesized image light.

* * * * *